(12) United States Patent
Lu et al.

(10) Patent No.: US 12,000,057 B2
(45) Date of Patent: Jun. 4, 2024

(54) METHOD FOR IMPROVING MECHANICAL PROPERTIES BY CHANGING GRADIENT NANOTWINNED STRUCTURE OF METALLIC MATERIAL

(71) Applicant: INSTITUTE OF METAL RESEARCH, CHINESE ACADEMY OF SCIENCES, Liaoning (CN)

(72) Inventors: Lei Lu, Liaoning (CN); Zhao Cheng, Liaoning (CN); Shuai Jin, Liaoning (CN)

(73) Assignee: INSTITUTE OF METAL RESEARCH, CHINESE ACADEMY OF SCIENCES, Liaoning (CN)

( * ) Notice: Subject to any disclaimer, the term of this patent is extended or adjusted under 35 U.S.C. 154(b) by 798 days.

(21) Appl. No.: 17/044,617

(22) PCT Filed: Sep. 20, 2018

(86) PCT No.: PCT/CN2018/106659
§ 371 (c)(1),
(2) Date: Nov. 30, 2020

(87) PCT Pub. No.: WO2019/227786
PCT Pub. Date: Dec. 5, 2019

(65) Prior Publication Data
US 2021/0147991 A1 May 20, 2021

(30) Foreign Application Priority Data
May 31, 2018 (CN) .................. 201810549146.X (51) Int. Cl.
*C25C 1/12* (2006.01)
*B82Y 40/00* (2011.01)
(Continued)

(52) U.S. Cl.
CPC .................. *C25C 1/12* (2013.01); *C25C 7/06* (2013.01); *C25D 5/617* (2020.08); *B82Y 40/00* (2013.01); *C25D 3/38* (2013.01)

(58) Field of Classification Search
None
See application file for complete search history.

(56) References Cited

U.S. PATENT DOCUMENTS

| 11,578,417 B2 * | 2/2023 | Wang .................. C25D 7/12 |
| 2006/0021878 A1 * | 2/2006 | Lu .......................... C22C 1/00 |
| | | 205/104 |
| 2021/0198799 A1 * | 7/2021 | Wang .................. C25D 3/38 |

FOREIGN PATENT DOCUMENTS

| CN | 103290183 A | 9/2013 |
| KR | 20120097344 A | 9/2012 |

OTHER PUBLICATIONS

Wei et al., Evading the strength-ductility trade-off dilemma in steel through gradient hierarchical nanotwins, Nature Communications, vol. 5, Apr. 2014, Article No. 3580, pp. 1-8 (Year: 2014).*
Chan et al., Growth of large-scale nanotwinned Cu nanowire arrays from anodic aluminum oxide membrane by electrochemical deposition process: controllable nanotwin density and growth orientation with enhanced electrical endurance performance, Nanoscale, vol. 6, No. 13, Jul. 2014, pp. 7332-7338 (Year: 2014).*
(Continued)

*Primary Examiner* — Harry D Wilkins, III
(74) *Attorney, Agent, or Firm* — NKL Law; Allen Xue (57) ABSTRACT

A method for improving mechanical properties by changing a gradient nanotwinned structure of metallic materials is the technical field of nanostructured metallic materials. The method uses the inherent principles of microstructure and mechanical properties of metallic materials to improve materials mechanical properties. The metallic materials has a gradient nanotwinned structure. The principles of microstructure and mechanical properties of the metallic materials mean that the mechanical properties of the metallic materials are adjusted by changing the structural gradient scale of the nanotwinned structure. The method combines two strengthening methods of nanotwins and gradient structure, and can (Continued)

obviously improve the mechanical properties of the metallic materials. For pure copper materials of the gradient nanotwinned structure prepared by an electrodeposition technology: the yield strength is 481±15 MPa, the tensile strength is 520±12 MPa, the uniform elongation can be 7±0.5%, and the elongation to failure can be 11.7±1.3%.

10 Claims, 6 Drawing Sheets

(51) Int. Cl.
    *C25C 7/06*     (2006.01)
    *C25D 5/00*     (2006.01)
    *C25D 3/38*     (2006.01)

(56) References Cited

OTHER PUBLICATIONS

Fang et al., Revealing Extraordinary Intrinsic Tensile Plasticity in Gradient Nano-Grained Copper, Science, vol. 331, No. 6024, Feb. 2011, pp. 1587-1590 (Year: 2011).*

Zhou, Haofei et al.; Investigation of Atomistic Deformation Mechanism of Gradient Nanotwinned Copper Using Molecular Dynamics Simulation Method; Acta Metallurgica Sinica, vol. 50, No. 2, Feb. 28, 2014, pp. 226-230.

Zhu, Jianliu; Microscopic Deformation Mechanism of Gradient Nano Twin Cu Used in Future Automobile Transmission System; Foundry Technology; vol. 36, No. 8, Aug. 31, 2015, pp. 1970 and 1971.

* cited by examiner

METHOD FOR IMPROVING MECHANICAL PROPERTIES BY CHANGING GRADIENT NANOTWINNED STRUCTURE OF METALLIC MATERIAL

TECHNICAL FIELD

The present invention relates to the technical field of nanostructured metallic materials, and particularly relates to a method for improving mechanical properties of the materials by manipulating its gradient nanotwinned structure.

BACKGROUND

Metallic materials is one of the materials which is used earliest and applied most widely by people. In the ancient Shang and Zhou Dynasties, Chinese used a large amount of bronze to make bell tripods and weapons, and used its ironware to make agricultural tools. Nowadays the metallic materials are still widely used in the fields of transportation, machinery, power electronics, petrochemicals and energy due to high strength, toughness, electrical conductivity and good processability, and have become the irreplaceable structural materials on which human beings rely on.

Most metallic materials are obtained by smelting metal ores. The grain size of the initial metallic materials is large, and the strength is generally low. In order to improve the strength of the metallic materials, after centuries of efforts, materials scientists have proposed various strengthening methods such as solid solution strengthening, deformation strengthening, grain refinement strengthening and second phase strengthening. The strengthening methods can effectively improve the strength of the materials and broaden the applications of the metallic materials. However, those approaches reduce the ductility of the metallic materials while strengthening the metallic materials. The high-strength but low-ductility metallic materials are greatly limited in industrial application.

With the development of the contemporary highly civilized society, more requirements have been put forward as to the properties of the metallic materials. High strength, good ductility and light weight of the metallic materials have become a focus of the development of the metallic materials. For example, the rapid development of high-speed trains put higher and higher requirements for the combined strength-ductility of the metallic materials. The main structures of an aircraft are still the metallic materials. Improvement of the toughness of the metallic materials can enhance the reliability of the aircraft and reducing the weight of the aircraft. In the industry of precision instruments, the materials are required to have extremely high strength and certain plasticity to achieve the purpose of size reduction. Therefore, how to maintain the excellent plasticity while improving the strength of the metallic materials becomes more critical.

In fact, the mechanical properties of the metallic materials rely on their microstructure. Change of the grain size is a common method to improve the mechanical properties of the metallic materials. From decades of researches, the grain size can be reduced through the deformation of the original metallic materials, thereby greatly improving the strength of the metallic materials, but the ductility is simultaneously reduced. When the grain size is less than 200 nm, the metallic materials has extremely high strength, but almost has no plastic deformation capability. Therefore, even though the change of the grain size can effectively adjust the strength and the plasticity of the metallic materials, the strong trade-off relation between strength and ductility makes it difficult for the metallic materials to achieve excellent overall properties.

Recent researches show that the introduction of the nanotwinned structure in the metallic materials can possess extremely high strength and good plasticity, which resolves the dilemma between high strength and low ductility. Bulk columnar nanotwinned copper materials can be prepared by direct current electro-deposition. The microstructure of the bulk materials is composed of columnar micron-sized grains, and the nanotwinned lamellae parallel to each other are distributed inside the columnar grains. The strength of the columnar nanotwinned copper is mainly determined by the twin thickness, and increases as the twin thickness decreases. The ductility is determined by the grain size and increases as the grain size increases. Therefore, the strength and the ductility of the columnar nanotwinned copper can be adjusted and improved by changing the twin thickness and the grain size. The investigated results show that the columnar nanotwinned structure can alter the strength-ductility trade-off relationship of the metallic materials. However, the twin thickness of the columnar nanotwinned copper has a positive correlation with the grain size, i.e., when the twin thickness decreases, the grain size also decreases. Thus, the ductility decreases when the strength increases; and the elongation to failure is only 2% when the yield strength exceeds 440 MPa.

Nowadays, gradient structures also enable the metallic materials to obtain good strength and toughness performance. Mechanical grinding or shot peening is conducted on the surface of rod-shaped metals to obtain a gradient structure that gradually transitions from coarse grains in the core to nanograins at surface. The gradient structure can improve the yield strength of coarse-grained pure copper materials by 2 times yet hardly lose the ductility. The mechanical properties of the metallic materials can be adjusted by changing the volume percentage of the gradient layer, i.e., as the percentage of the gradient layer is increased, the strength is increased but the ductility decreases. Therefore, even though the method can alter the strength-ductility trade-off relationship of the metallic materials, it is still difficult to achieve good ductility when the metallic materials possess high strength.

SUMMARY

In order to solve the problem that the existing metallic materials is difficult to have both high strength and good ductility, the present invention provides a method for improving mechanical properties by changing a gradient nanotwinned structure of metallic materials. Combining two effective strengthening strategies of nanotwinned strengthening and gradient structure strengthening, the present invention enables metallic materials to achieve excellent strength-ductility by using the relationship between microstructure and mechanical properties of gradient nanotwinned structure.

To achieve the above objectives, the present invention adopts the following technical solution:

A method for improving mechanical properties by changing a gradient nanotwinned structure of metallic materials is disclosed. The method uses the principles of microstructure and mechanical properties of metallic materials to improve mechanical properties; the metallic materials have gradient nanotwinned structures; and the principles of microstructure and mechanical properties of the metallic materials mean that the mechanical properties of the metallic materials can be adjusted by changing the scale of structural gradient of the nanotwinned structure.

The gradient nanotwinned structure is formed by superimposing N gradient layers (N is a positive integer and N≥1); each gradient layer is composed of micron-sized grains; the micron-sized grain comprises nano-sized twins; a grain size range is 0.5-50 μm; and twin thickness range is 1 nm-1000 nm; the grain size or twin thickness in each gradient layer presents a gradual change from small to large or from large to small from bottom to top (along a gradient direction); the corresponding microhardness in each gradient layer also presents a gradual change from large to small or from small to large from bottom to top; therefore, the change of the hardness within a unit distance along the gradient direction is used to represent the change speed of the microstructure (the grain size or the twin lamellae) from bottom to top, and is defined as a structural gradient.

In the principles of the microstructure and mechanical properties of the metallic materials, when the structural gradient increases, the yield strength and work hardening rate of the metallic materials increase simultaneously, and the elongation to failure is unchanged.

The use of the principles of the microstructure and mechanical properties of metallic materials to improve the materials mechanical properties means that, when the structural gradient of the gradient nanotwinned structure increases, the yield strength and the work hardening rate of the bulk metallic materials increase simultaneously while the elongation to failure is unchanged.

Under the conditions of room temperature and tensile rate of $5 \times 10^{-3}$ $s^{-1}$, when the structural gradient of pure copper materials is 1-50 GPa/mm, the yield strength is 300-500 MPa, the tensile strength is 350-600 MPa, a uniform elongation is 5-15% and the elongation to failure is 10-20%; and when true strain is 1%, the work hardening rate is 1-3 GPa.

The present invention has the following advantages:

1. The present invention has unique microstructure and strengthening mechanism.

The present invention combines two strengthening methods of nanotwinned structure and gradient structure. The thicknesses and the width of the twin lamellae present continuous gradient changes along the gradient direction from large to small or from small to large. This is clearly different from the microstructures uniformly distributed in the conventional materials. The mechanism of nanotwin strengthening and the mechanism of gradient materials strengthening are not contradictory, and can have complementary advantages, to exert a stronger strengthening effect.

2. The present invention creatively discovers the principle of the gradient nanotwinned structure and the mechanical properties in the metallic materials, and changes the magnitude of the structural gradient to improve the overall mechanical properties of the metallic materials, i.e., changes or the rate of change the grain size and the twin thickness along the gradient direction to control the mechanical properties of the metallic materials, such as strength, the work hardening rate and ductility.

3. High strength is matched with excellent (uniform) plasticity:

The present invention increases the structural gradient of the gradient nanotwinned structure to increase the yield strength and the work hardening rate of the metallic materials and simultaneously keep the elongation to failure unchanged. The pure copper materials strengthened by the method has high room-temperature tensile strength, and for example, the yield strength reaches 481±15 MPa with the elongation to failure of 12±1%. Such characteristics is a breakthrough from the limitation that almost no ductility when the yield strength of direct current electrodeposited nanotwinned copper is greater than 440 MPa.

4. The application range is wide:

The application range of the present invention is broad. Metallic materials with low stacking fault energy (such as copper, TWIP steel and copper alloy) are very easy to produce the nanotwinned structure during deformation or growth. The gradient nanotwinned structure can be achieved only by performing non-equi-strain treatment or design on these materials, such as gradient deformation treatment of surface mechanical grinding, gradient changes of process parameter in electro-deposition or magnetron sputtering of copper or other alloys, and the like. The principles of the gradient nanotwinned structure and the mechanical properties are further used to improve the mechanical properties of the other corresponding materials.

DETAILED DESCRIPTION

The gradient nanotwinned copper materials in the following embodiments were prepared by a direct current electrodeposition technology. The specific preparation process and parameters are as follows:

Electrodeposition device: DC stabilized voltage and stabilized current power supply;

Requirements for an electrolyte used for electrodeposition: MOS grade purity $CuSO_4$ solution; the metal impurity content of the electrolyte was strictly controlled; the water used for preparing the electrolyte was high-purity deionized water; analytically pure $H_2SO_4$ was used to adjust the pH value of the electrolyte; and the electrolyte was pH=1.

The following additives were added to the above $CuSO_4$ solution:

A gelatin aqueous solution with a concentration of 5 wt. % prepared by analytically pure gelatin was used, and addition amount is 1 mL/L;

A NaCl aqueous solution with a concentration of 10 wt. % prepared by high-purity NaCl was used, and addition amount is 0.6 mL/L.

Cathode and anode requirements: a cathode was a pure copper plate with purity higher than 99.99%, and an anode was a pure titanium plate.

Electrodeposition process parameters: current density was 30 mA/cm$^2$; DC electrodepositing: the distance between the cathode and the anode was 100 mm; the area ratio of the cathode to the anode was 15:1; and the cathode and the anode were placed in parallel (center symmetry).

In the deposition process, the structural gradient of pure copper materials was controlled by controlling the temperature change of the electrolyte. The control of the temperature change of the electrolyte refers to controlling the temperature of the electrolyte to gradually increase or decrease with time; the grain size of the obtained pure copper materials in the direction perpendicular to a deposition surface (gradient direction) and the twin thickness increased or decreased accordingly; the scale of structural gradient of the pure copper materials was controlled by controlling the temperature increasing or decreasing rate of the electrolyte; and in the deposition process, the temperature range of the electrodeposition was: 5-60° C., and the electrodeposition time was 0.1-500 hours.

The present invention is illustrated below in detail in combination with the drawings and the embodiments.

Embodiment 1

Figure 1:
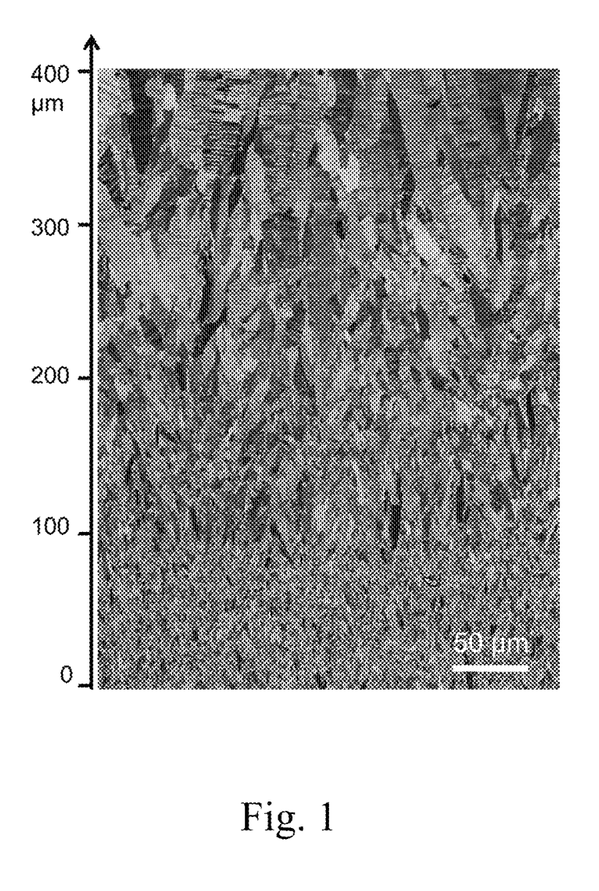
FIG. 1 is a microstructure diagram of gradient nanotwinned copper in the thickness direction under a scanning electron microscope in embodiment 1.

The total thickness of a copper materials of gradient nanotwinned structure was 400 μm. The sample was composed of micron-sized columnar grains which grow along the deposition direction. The grains contain high-density twin boundaries, and most twin boundaries are parallel to a growth surface. In the present embodiment, the pure copper has one gradient layer. The grain size and the twin thickness in the materials present a monotonically increasing gradient change along the thickness direction; the average grain size was gradually changed from 2.5 μm to 15.8 μm; and the average twin thickness was gradually changed from 29 nm to 72 nm, as shown in FIG. 1.

Figure 2:
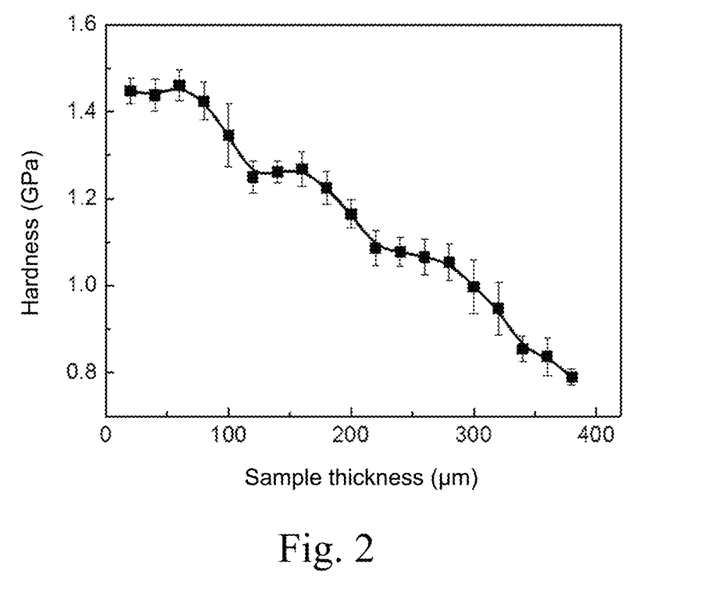
FIG. 2 shows sample cross-sectional microhardness distribution of gradient nanotwinned copper along the thickness direction in embodiment 1.

In the present embodiment, the microhardness of the gradient nanotwinned copper materials gradually decreased along the thickness direction from 1.5 GPa to 0.8 GPa, which accomplished gradient distribution; and the structural gradient was 1.75 GPa/mm, as shown in FIG. 2.

Figure 3:
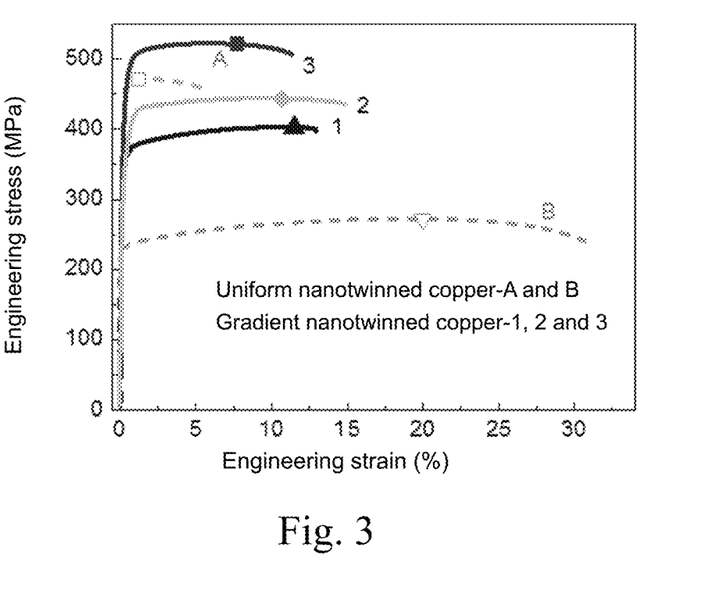
FIG. 3 shows engineering stress-strain curves of gradient nanotwinned copper and uniform nanotwinned copper in embodiments 1-3.

In the present embodiment, room temperature tension of the gradient nanotwinned copper materials: curve 1 in FIG. 3 is an engineering stress-strain curve of the electrodeposited gradient nanotwinned copper sample of the present embodiment at room temperature. When the tensile rate is $5\times10^{-3}$ s$^{-1}$, the yield strength of the gradient nanotwinned copper is 364±12 MPa, the tensile strength is 397±11 MPa, the uniform elongation is 9.8±1.7%, and the elongation to failure is 12.9±1.9%.

Embodiment 2

Embodiment 2 is different from embodiment 1 in that:
The gradient nanotwinned copper materials has two gradient layers. The grain size and the twin thickness in the materials present a symmetrical gradient change that increased at first and then decreased along the thickness direction, as shown in FIG. 4.

Figure 5:
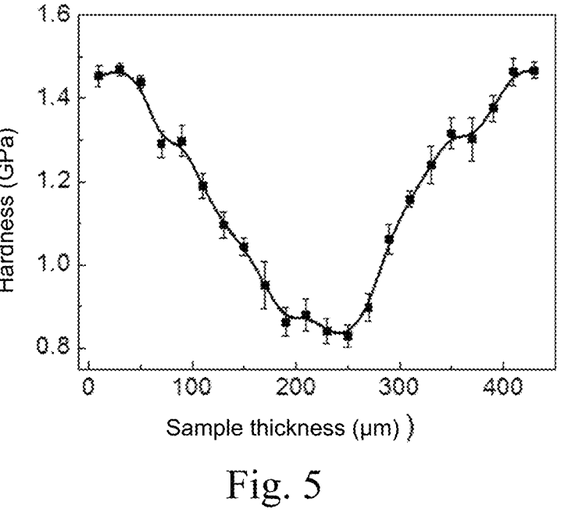
FIG. 5 shows sample cross-sectional microhardness distribution of gradient nanotwinned copper along the thickness direction in embodiment 2.

In the present embodiment, the cross-sectional hardness of the gradient nanotwinned copper decreased at first and then increased along the thickness direction; and the structural gradient is 3.2 GPa/mm, as shown in FIG. 5.

Figure 4:
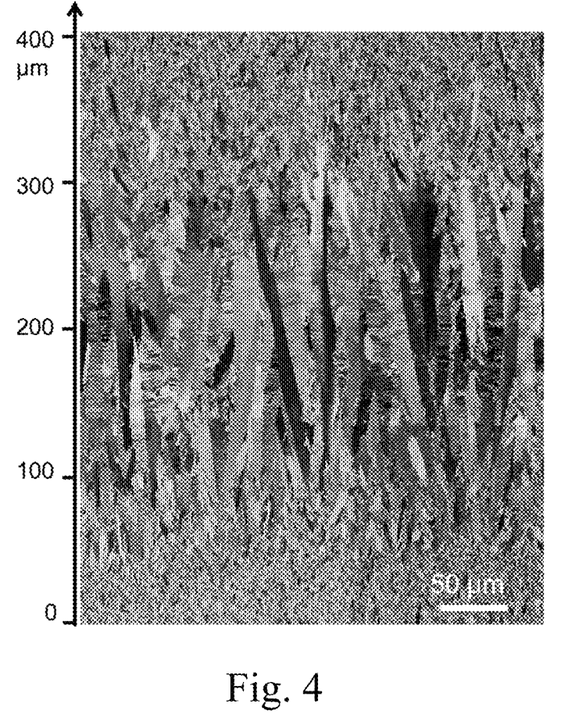
FIG. 4 is a microstructure diagram of gradient nanotwinned copper in the thickness direction under a scanning electron microscope in embodiment 2.

In the present embodiment, room-temperature tension of the gradient nanotwinned copper materials: when the tensile rate is $5\times10^{-3}$ s$^{-1}$, the yield strength is 437±19 MPa, the tensile strength is 471±18 MPa, the uniform elongation is 9.2±1%, and the elongation to failure is 14±1.9%, as shown by curve 2 in FIG. 4.

Embodiment 3

Figure 6:
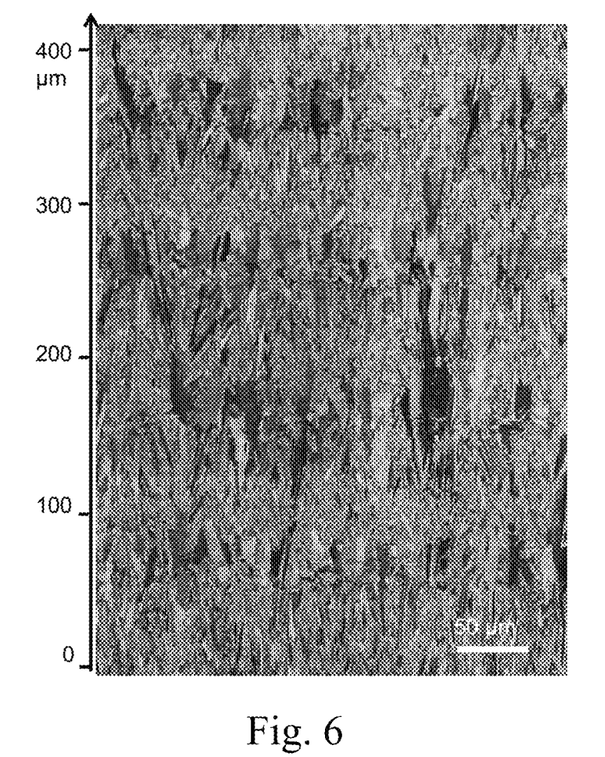
FIG. 6 is a microstructure diagram of gradient nanotwinned copper in the thickness direction under a scanning electron microscope in embodiment 3.

Embodiment 3 is different from embodiment 1 in that:
The gradient nanotwinned copper materials has eight gradient layers. The grain size and the twin thickness in the materials present a four-period gradient change that increased at first and then decreased along the thickness direction, and the microstructure diagram of the materials is shown in FIG. 6.

Figure 7:
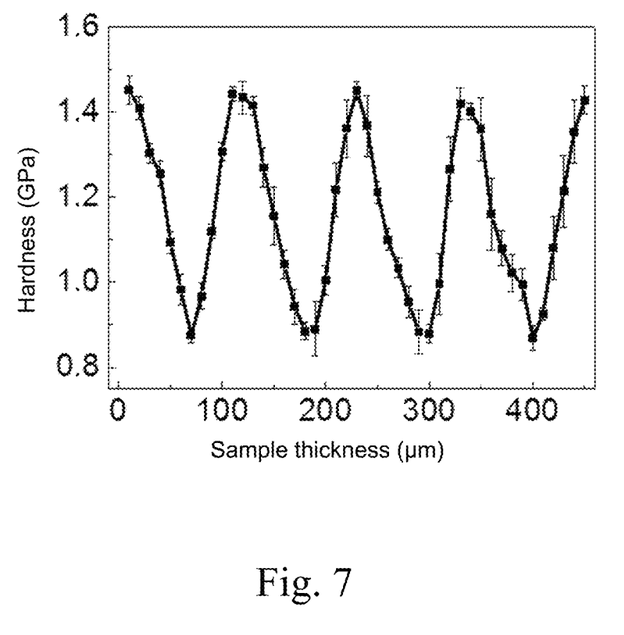
FIG. 7 shows sample cross-sectional microhardness distribution of gradient nanotwinned copper along a thickness direction in embodiment 3.

In the present embodiment, the hardness of the gradient nanotwinned copper presents a four-period gradient change that decreased at first and then increased along the thickness direction; and the structural gradient is 11.6 GPa/mm, as shown in FIG. 7.

In the present embodiment, room-temperature tension of the gradient nanotwinned copper materials: when the tensile rate is $5\times10^{-3}$ s$^{-1}$, the yield strength is 481±15 MPa, the tensile strength is 520±12 MPa, the uniform elongation is 7±0.5% and the elongation to failure is 11.7±1.3%, as shown by curve 3 in FIG. 4.

Figure 8:
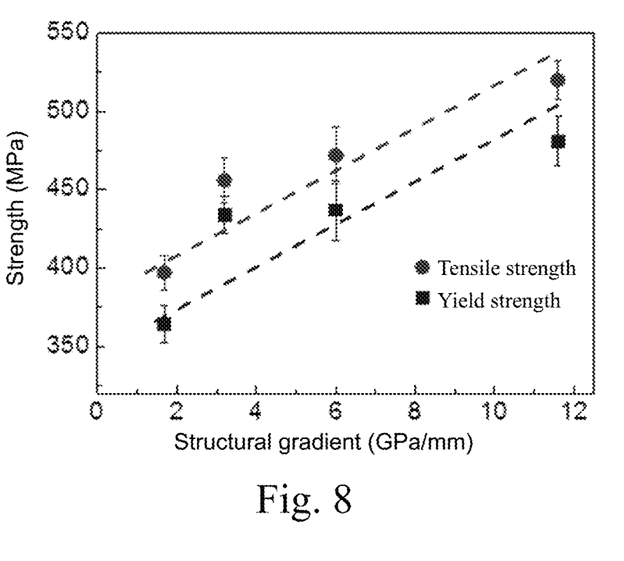
FIG. 8 shows change of yield strength and tensile strength of gradient nanotwinned copper with structural gradient.
Figure 9:
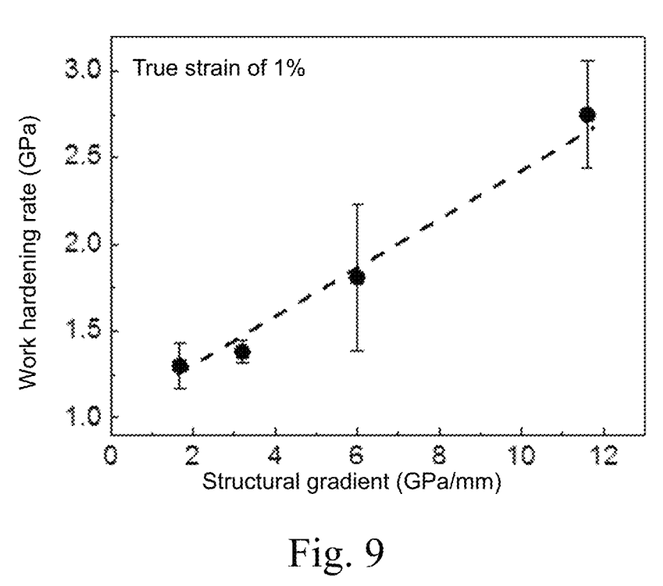
FIG. 9 shows change of work hardening rate of gradient nanotwinned copper with structural gradient when true strain is 1%.
Figure 10:
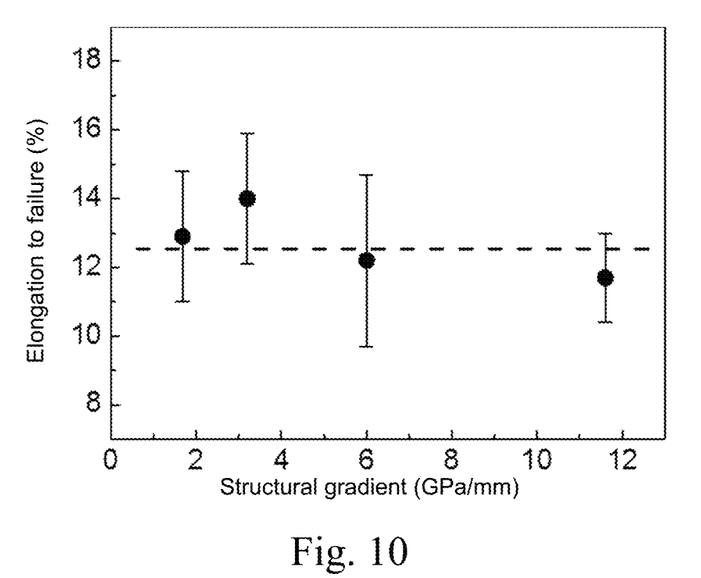
FIG. 10 shows change of elongation to failure of gradient nanotwinned copper materials with structural gradient.

It can be seen from the above embodiments that the structural gradient increased from 1.75 GPa/mm to 11.6 GPa/mm, the yield strength of the pure copper materials increased from 364±12 MPa to 481±15 MPa, and the elongation to failure is substantially unchanged at 12-14%. FIG. 8, FIG. 9 and FIG. 10 respectively describe the effect of the structural gradient of the pure copper materials on strength, work hardening rate and elongation to failure, indicating that as the structural gradient increases, the yield strength, tensile strength and the work hardening rate of the pure copper significantly increases and the elongation to failure is unchanged. It shows that the change of the structural gradient can effectively regulate the mechanical properties of the metallic materials, so that the metallic materials has both high strength and good plasticity.

Comparative Example 1

When ordinary annealed coarse-grained pure copper (the grain size is about 25 μm) was tensioned at room temperature, the yield strength is 50 MPa, the tensile strength is about 200 MPa and the elongation to failure is about 50%. After cold rolling deformation, the yield strength and the tensile strength of the copper can be respectively increased to 250 MPa and 290 MPa, respectively, and the elongation to failure is about 8%.

Comparative Example 2

Australian scientists F. Dalla Torre et al. used the equal channel angular pressing (ECAP) severe plasticity technology to treat pure copper. After two passes of treatment, the microstructure evolved into a uniform layer sheet structure with a sheet layer thickness of about 200 nm. Tensile test results show that the yield strength is about 440 MPa, but the elongation to failure is less than 5% and the uniform elongation is less than 1%.

Comparative Example 3

Lei Lu research group in Institute of Metal Research, Chinese Academy of Sciences in China used direct-current electrodeposition to prepared a nanotwinned copper sample. The sample is composed of micron-sized columnar grains which grow along the deposition direction. The grains contain high-density twin boundaries, and most twin boundaries are parallel to a growth surface. The tensile properties of the materials depend on the microstructure of the materials (the grain size and the twin lamellae thickness). When the average twin lamellae thickness of the sample (A sample in FIG. 4) is 29 nm and the average grain size is 2.5 µm, the yield strength is 446±10 MPa, the tensile strength is 470±11 MPa and the elongation to failure is only 2±1%. When the average twin thickness of the sample (B sample in FIG. 4) is 95 nm and the average grain size is 18 µm, the yield strength is 223±9 MPa, the tensile strength is 272±4 MPa and the elongation to failure is 29±3%.

Comparative Example 4

Ke Lu research group in Institute of Metal Research, Chinese Academy of Sciences in China used surface mechanical grinding technology to treat pure copper rods with a diameter of 6 mm. The obtained microstructure is a gradient nanograined structure with a coarse-grained structure (the grain size is about 25 µm) in the core gradually transitioned to nanograins (the grain size is about 20 nm) at the surface. A gradient nanograined layer is located within 150 µm of the surface of the materials, a deformed coarse-grained layer is in a position from 150 µm to 700 µm, and the remaining core is a coarse-grained matrix that was not affected by the deformation. When the materials was tensioned at room temperature, the yield strength was 150 MPa, and the elongation to failure was 50%.

The results of the above embodiments and comparative examples show that, compared with the conventional strengthening methods (rolling deformation, severe plasticity deformation, introduction of nanotwinned structure, and introduction of gradient structure), the strengthening method using the gradient nanotwinned structure has obvious strengthening advantages. For example, compared with the rolling method, the strengthening method using the gradient nanotwinned structure can obtain materials with higher strength and better ductility. Compared with the nanolayered structure obtained by the severe plasticity deformation, the gradient nanotwinned structure can maintain higher strength and better ductility. Compared with the uniform nanotwinned structure, the strengthened gradient nanotwinned structure has the strength greater than the strength of the strongest uniform nanotwinned materials A, and also has better ductility, and overcomes the disadvantage that high-strength uniform nanotwinned materials has almost no ductility, which makes the advantage of the gradient structure apparent. Compared with the gradient nanograined structure, the gradient nanotwinned structure has the strength which is higher by about 4 times, has considerable ductility, and overcomes the disadvantage that the gradient nanostructure with good ductility has lower strength, which makes the advantage of the nanotwinned structure apparent. In conclusion, the gradient nanotwinned structure combines the advantages of the nanotwinned structure and the gradient structure, and can solve the problem that the metallic materials is difficult to simultaneously have high strength and good ductility. The structural gradient size of the gradient nanotwinned structure is also adjusted to effectively regulate the mechanical properties of the metallic materials.

The invention claimed is:

1. A method for preparing a metallic material having a gradient nanotwinned structure, comprising:
   placing a cathode and an anode in an electrolyte, wherein the electrolyte comprises metal cations;
   carrying out electrodeposition by applying a direct current to the cathode and the anode;
   changing a temperature of the electrolyte during the electrodeposition; and
   obtaining the metallic material having the gradient nanotwinned structure.

2. The method of claim 1, wherein the temperature of the electrolyte is in a range of 5° C. to 60° C.

3. The method of claim 1, wherein the electrolyte comprises copper cations and the metallic material is a gradient nanotwinned copper.

4. The method of claim 3, wherein a structural gradient of the nanotwinned copper is 1-50 GPa/mm.

5. The method of claim 4, wherein, at room temperature and a tensile rate of $5\times10^{-3}$ s$^{-1}$, the nanotwinned copper has a yield strength of 300-500 MPa, a tensile strength of 350-600 MPa, and a uniform elongation of 5-15%.

6. The method of claim 4, wherein, when a true strain is 1%, the nanotwinned copper has a work hardening rate of 1-3 GPa.

7. The method of claim 1, wherein increasing the temperature of the electrolyte increases a grain size of the metallic material having the gradient nanotwinned structure.

8. The method of claim 1, further comprising: changing a rate of temperature change to changing a scale of a structural gradient of the metallic material having the gradient nanotwinned structure.

9. The method of claim 1, wherein decreasing the temperature of the electrolyte decreases a grain size of the metallic material having the gradient nanotwinned structure.

10. The method of claim 1, wherein increasing the temperature of the electrolyte decreases a grain size of the metallic material having the gradient nanotwinned structure.

* * * * *